United States Patent
Sällqvist

[11] Patent Number: 6,042,316
[45] Date of Patent: *Mar. 28, 2000

[54] CHAMFERED END HEADED RIVET

[75] Inventor: Jan-Eric Sällqvist, Ytterby, Sweden

[73] Assignee: AB Volvo, Switzerland

[*] Notice: This patent issued on a continued prosecution application filed under 37 CFR 1.53(d), and is subject to the twenty year patent term provisions of 35 U.S.C. 154(a)(2).

[21] Appl. No.: 08/913,800

[22] PCT Filed: Mar. 20, 1996

[86] PCT No.: PCT/SE96/00355

§ 371 Date: Jan. 21, 1998

§ 102(e) Date: Jan. 21, 1998

[87] PCT Pub. No.: WO96/29519

PCT Pub. Date: Sep. 26, 1996

[30] Foreign Application Priority Data

Mar. 23, 1995 [SE] Sweden ................................. 9501062

[51] Int. Cl.[7] .................................................. F16B 19/06
[52] U.S. Cl. .......................................... 411/507; 411/504
[58] Field of Search ................................. 411/501, 504, 411/507, 508, 484, 486, 399; 29/525.06

[56] References Cited

U.S. PATENT DOCUMENTS

| | | |
|---|---|---|
| 933,865 | 9/1909 | Umholtz .................................. 411/399 |
| 1,751,799 | 3/1930 | Dickson . |
| 1,947,906 | 2/1934 | Fine ........................................ 411/504 |
| 2,982,166 | 5/1961 | Hobbs ..................................... 411/399 |

FOREIGN PATENT DOCUMENTS

| | | | |
|---|---|---|---|
| 826586 | 1/1952 | Germany ............................... 411/504 |
| 127941 | 3/1950 | Sweden .................................. 411/504 |
| 479814 | 11/1969 | Switzerland . |
| 28425 | of 1905 | United Kingdom .................. 411/504 |
| 318736 | 9/1929 | United Kingdom . |
| 694368 | 7/1953 | United Kingdom .................. 411/507 |
| 91/19109 | 12/1991 | WIPO . |

*Primary Examiner*—Flemming Saether
*Attorney, Agent, or Firm*—Lerner, David, Littenberg, Krumholz & Mentlik, LLP

[57] ABSTRACT

The invention relates to a rivet for joining surface treated objects. The rivet is designed for decreasing the stress and damage that may occur on the surface treated object or frame during the riveting process. The rivet includes a shaft and a head including an upper limit surface and a contact surface. The contact surface consists of an outer partial surface and an inner partial surface, the outer partial surface adjoining the inner partial surface at an intersection spaced from the shaft. The outer partial surface extends from the intersection in a direction away from the shaft and the inner partial surface. During the riveting process, the rivet deforms so that the entire contact surface contacts the surface treated object or frame.

9 Claims, 4 Drawing Sheets

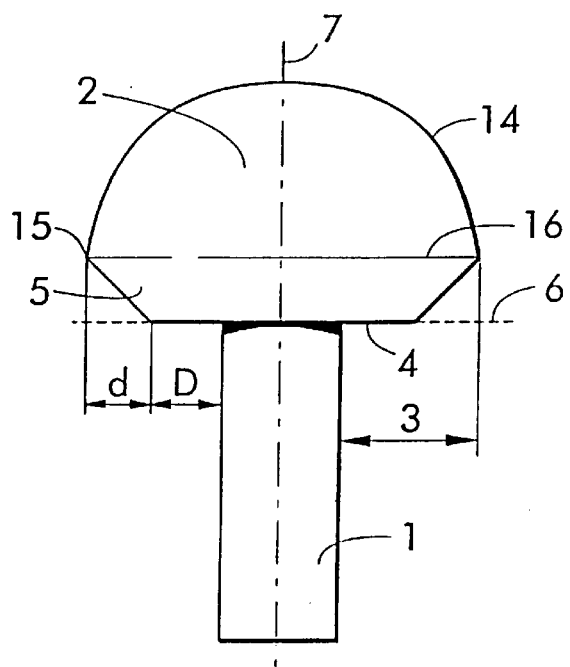
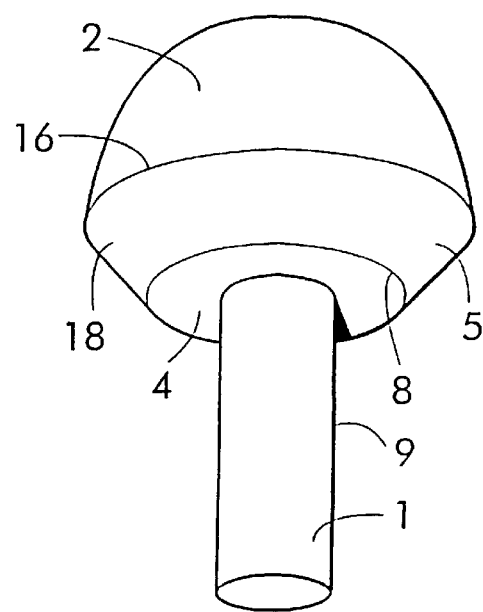
FIG. 1a    FIG. 1b
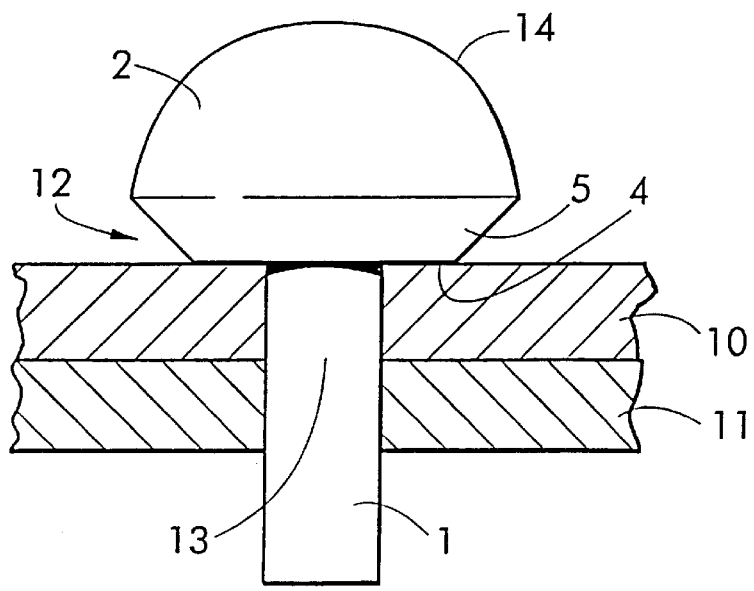
FIG. 1c

CHAMFERED END HEADED RIVET

TECHNICAL FIELD

The present invention relates to a rivet suitable for joining surface treated objects, such as beams for the chassis of a truck.

BACKGROUND OF THE INVENTION

In making frameworks by joining of beams has previously a manufacturing method been used where non surface treated beams are joined by riveting. A surface coating has been applied to the framework when the beams have been joined. In a modernised manufacturing process the procedure of manufacturing has been altered so that the beams are coated prior to the joining of the beams. A result of this manufacturing process is that a surface coated layer is positioned between the head of the rivet and the beam. The rivet is deformed by subjecting it to a substantial pressure in the procedure of joining of the beams by the rivet. In using this process there is a high risk of damaging the underlying layer of surface coating, resulting in surface corrosion and an initial risk of corrosion of the beam. The damage occurs due to the facts that the portion of the head of the rivet that is in contact with the surface coating is shaped with a sharp edge and that said portion of the head is deformed, whereupon a displacement of material under substantial pressure occurs in the radial direction of the rivet. The sharp edge may easily harm the surface coating and said displacement of the material may result surface tension in the coating and that the coating is partly removed.

DISCLOSURE OF THE INVENTION

The object of the invention is to provide a rivet which does not harm the surface coating of the object to be riveted.

For accomplishing the object of the present invention, a rivet for joining surface coated objects is provided, comprising a head having a contact surface consisting of an inner partial surface in a first plane and an outer partial surface and a shaft. The shaft has a surface and a central axis and extends from the inner partial surface of the contact surface of the head substantially perpendicularly to the first plane of the inner partial surface. The outer partial surface adjoins the inner partial surface at an intersection spaced from the surface of the shaft and the outer partial surface extends from the intersection in a direction away from the shaft and the inner partial surface so that the outer partial surface is displaced from the first plane.

The rivet may include an outer partial surface which is radially displaced at a greater distance in a radial direction from the central axis than the inner partial surface. The inner partial surface may be planar and the intersection between the inner partial surface and the outer partial surface may comprise a continuous transition between those surfaces. The intersection between the inner partial surface and the outer partial surface may be curved.

The head of the rivet may include an upper limit surface adjoining the outer partial surface and the outer partial surface may have a conical shape. The conical shape may be truncated by the inner partial surface and the upper limit surface.

The inner partial surface may have a radial dimension D and the outer partial surface may have a radial dimension d. The relation of D over d is preferably larger than about one third and less than about 10. The outer surface may be adapted to contact a surface treated object after the rivet has been deformed during the riveting process.

Another aspect of the invention is a rivet for joining surface treated objects, comprising a head having an upper limit surface and a contact surface consisting of an inner partial surface and an outer partial surface. The rivet also includes a substantially cylindrical shaft having a shaft diameter, a surface and a central axis, the shaft extending from the inner partial surface of the contact surface mainly perpendicularly to the inner partial surface. The head has a head diameter larger than the shaft diameter and the outer partial surface joins the inner partial surface at an intersection spaced from the surface of the shaft. The outer partial surface extends from the intersection in a direction away from the shaft and the inner partial surface.

The upper limit surface of the head and the head diameter may define a head area and the head may include a transition from an upper limit surface to the contact surface at the head area. The inner partial surface may be planar and the intersection between the inner partial surface and the outer partial surface may comprise a continuous transition between those surfaces.

The intersection between the inner partial surface and the outer partial surface may be curved. The outer partial surface may have a conical shape and be truncated by the inner partial surface and the upper limit surface.

The inner partial surface may have a radial dimension D and the outer partial surface may have a radial dimension d and the relation of D over d is preferably larger than about one third and less than about 10.

The outer partial surface may be adapted to contact the surface treated object after the rivet has been deformed during the riveting process.

BRIEF DESCRIPTION OF THE DRAWINGS

The invention will in the following be described in a couple of modes for carrying out the invention with references to the appended drawings.

FIG. 1a shows a rivet with a semi-sphereically shaped head.

FIG. 1b shows a rivet obliquely from below.

FIG. 1c shows a rivet placed in a recess of a frame.

PREFERRED EMBODIMENT

Figure 2:
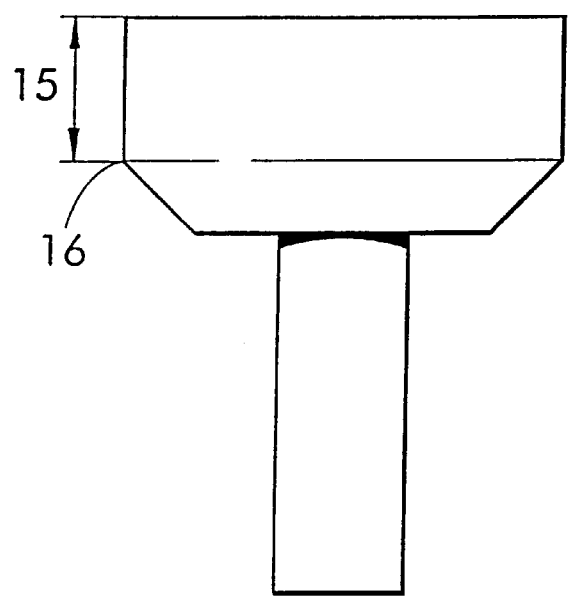
FIG. 2 shows a rivet with a flat head.

The rivet comprises a preferably cylindrical shaft 1 with a head 2. The shaft may also have a non circular cross-section. It may for example be shaped as an oval or a polygon. The shaft extends from a contact surface 3 arranged on the head. The contact surface is divided into an inner partial surface 4 and an outer partial surface 5. The shaft adjoins the inner surface at a plane 6 which coincides with the inner surface. The shaft has a central axis 7. The central axis extends in a direction mainly perpendicular to the inner surface. The inner surface extends further from the central axis of the shaft than the shaft itself. This means that the outer rim 8 (FIG. 1b) of the inner surface is at a greater distance from the central axis than the limit surface 9 of the shaft. The outer surface is adjoining the inner surface at the outer rim of the inner surface. The outer surface extends further from the central axis of the shaft than the inner surface. The inner surface thus transcends to the outer surface at the outer rim of the inner surface. The outer surface is situated on the side of the plane 6 which is facing away from the shaft to ensure that outer surface of the contact surface is not in contact with the frame 10, 11 (FIG. 1c) prior to the deformation of the rivet. Thus, a space exists between the outer surface of the rivet and the frame 10 when the rivet is fitted into a passage 13 of the frame 10. This space will be substantially eliminated when the rivet is deformed during the riveting process. Thus the outer surface, except from where it adjoins the inner surface, is positioned at a distance from the plane 6.

In a preferred embodiment of the invention the rivet is shaped circularly symmetrical with the axis of symmetry. This preferred embodiment is illustrated in FIGS. 1a through 1c. This embodiment refers to a rivet including a mainly cylindrical shaft and a head with a diameter exceeding the diameter of the shaft. The head includes an upper limit surface 14 and a contact surface 3. The transition from the upper limit surface to the contact surface is situated within an area 15 where the head has its maximum radial extension in the radial direction and at the points within this area which are closest to the shaft. These points form the transition line 16 (FIG. 1b) between the upper limit surface and the contact surface. The contact surface includes an inner surface 4 extending sustantially perpendicular to the axis of symmetry of the shaft and which is substantially symmetrical with respect to said axis of symmetry, and an outer surface adjoining the inner surface. The outer surface consists of an inner area 18 and the boundary lines of the outer surface. These boundary lines coincides partly with the outer rim 8 (FIG. 1b) of the inner surface and partly with the transition line 16 (FIG. 1b) between the upper limit surface and the contact surface. Points in the inner area 18 of the outer surface are situated at a greater distance, in the axial direction of the rivet, from the end of the shaft, than any point on the inner partial surface. The end of the shaft is more distant from the head than points on the outer partial surface. An inner point of an area refers to a all points on an area which are not situated on the edge or rim of the surface. The outer surface is situated on the side of the plane 6 which is facing away from the shaft to ascertain that outer surface of the contact surface is not in contact with the frame portions 10,11 (FIG. 1c) to be joined prior to the deformation of the rivet. Thus, a space exists between the outer surface of the rivet and the frame 10 when the rivet is fitted into a passage 13 of the frame 10. This space will be substantially eliminated when the rivet is deformed during the riveting process. Thus, the outer partial surface, except from where it adjoins the inner partial surface, is positioned at a distance from the plane 6.

A particularly advantageous embodiment includes a transition between the inner partial surface and the other partial surface which is smooth. By providing that the transition between the inner partial and outer partial surface is smooth and without edges the risk of rupturing of the surface treatment is considerably decreased.

Figure 4A:
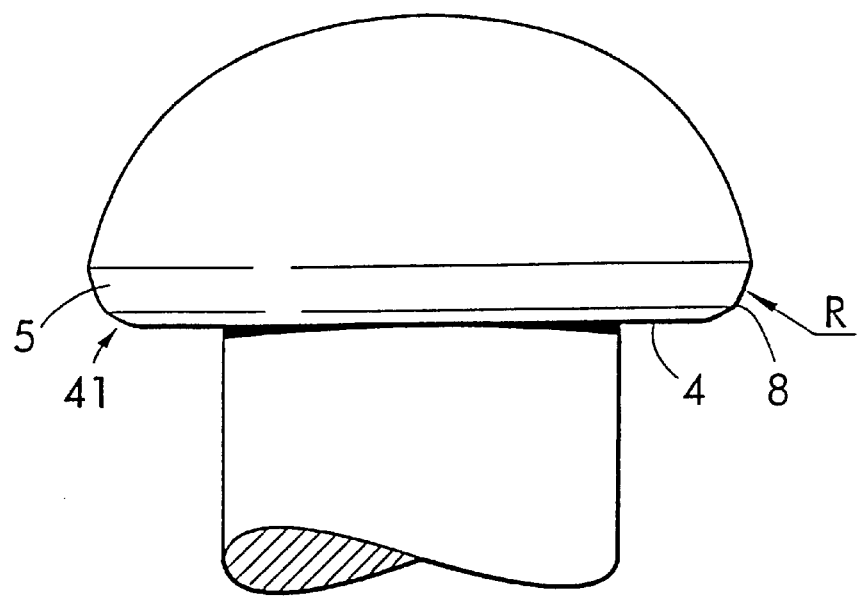
FIG. 4a–4d shows a number of preferred embodiments of the rivet.
Figure 4B:
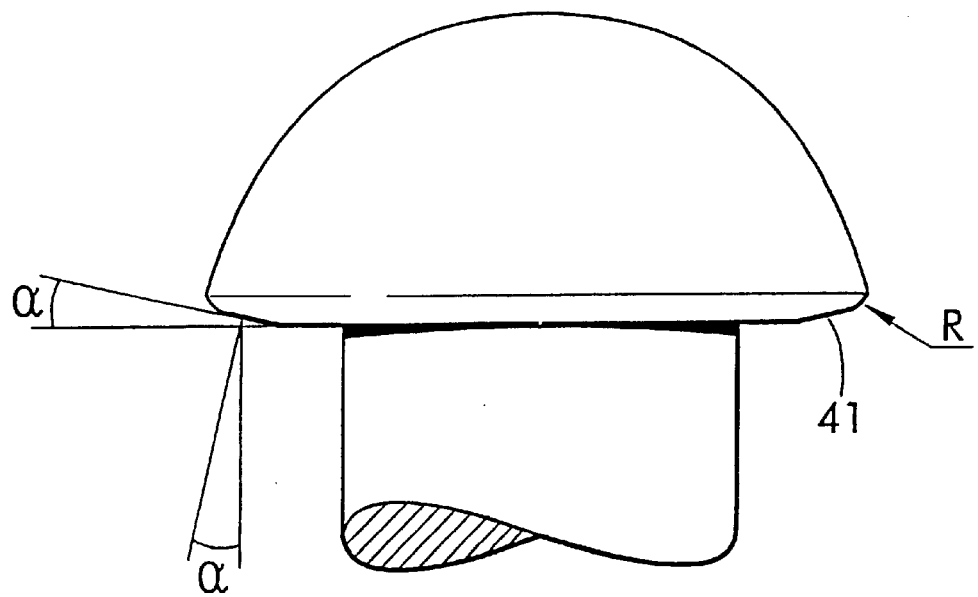

FIGS. 4a–4d shows preferred embodiments according to the invention. FIG. 4a and 4b shows a rivet with a substantially semi-spherical head. In FIG. 4a the outer limit surface is provided with an inner surface 41 having a radius of curvature of 2–2,5 mm. The transition 8 between the outer partial surface 5 and the inner partial surface 4 is shaped so that the perpendicular of these surfaces changes continuously. The inner surface 41 of the outer partial surface stretches at least 1 mm in the radial direction before its shape is changed into the natural radius formed when shaping the rivet.

In FIG. 4a the outer partial surface is provided with an inner surface 41, which is shaped as a truncated cone. The surface perpendicular of said inner surface 41 makes an angeal of 15° with the symmetry axis of the shaft. The inner surface 41 of the outer partial surface extends at least 1 mm in the radial direction before its shape is changed into the natural radius formed when shaping the rivet.

Figure 4C:
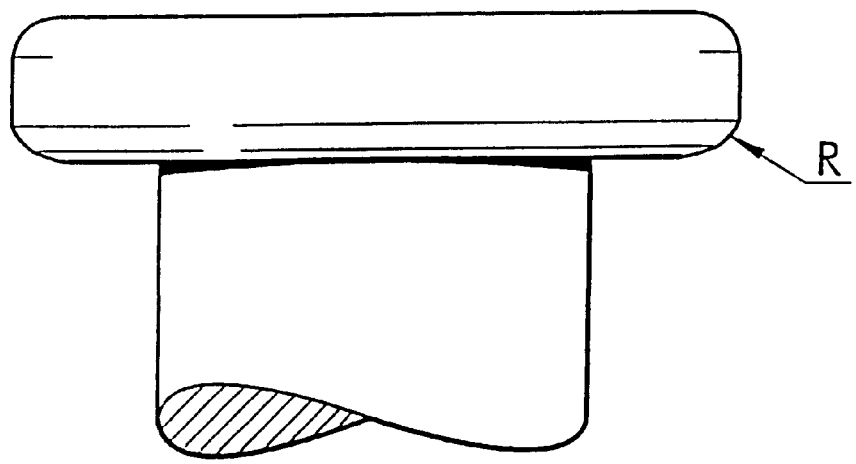
Figure 4D:
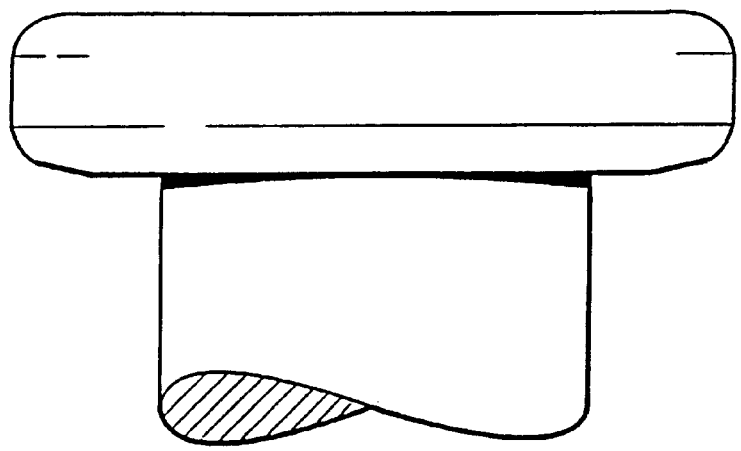

FIG. 4c and 4d shows rivets with substantially flat heads. FIG. 4c shows a contact surface corresponding to that of the rivet as described in relation to FIG. 4a. FIG. 4d shows a contact surface corresponding to that of the rivet as described in relation to FIG. 4b.

FIG. 2 shows an alternative embodiment of the shape of the head of the rivet. The transition from the upper limit surface to the contact surface is situated within an area 15 where the head has its maximum radial extension and at the points within this area which are closest to the shaft. The shape of the head of the rivet can, with exception of the contact surface, be arbitrarily chosen.

Figure 3:
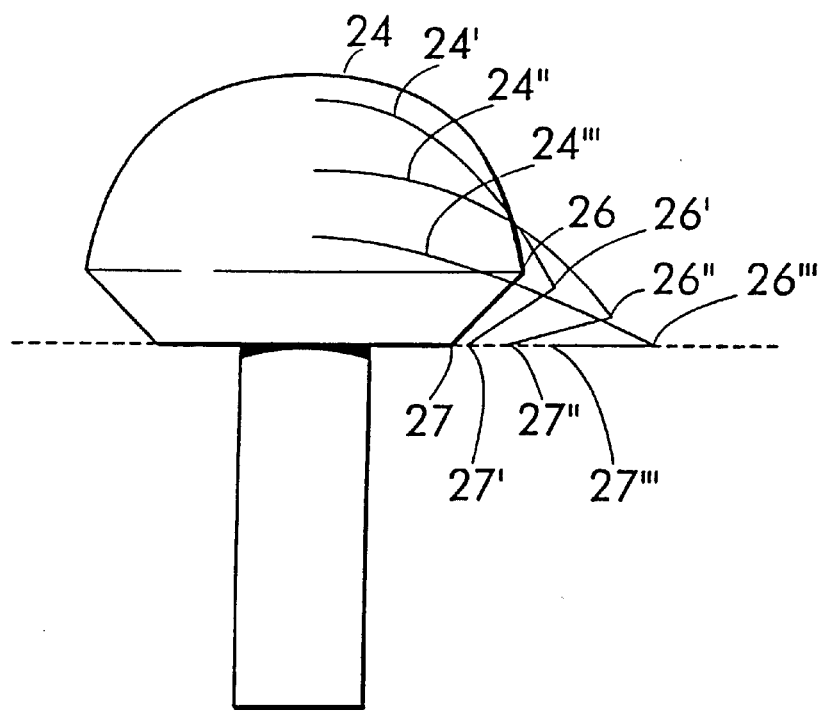
FIG. 3 shows the schematical deformation of the rivet.

FIG. 3 shows a schematical representation of the deformation process of the rivet. The points 26 and 27 are presented at three different degrees of deformation. The point 27 is transported in radial direction only, while the point 26 is transported both in the radial and the axial direction. The upper limit surface of the rivet is changed from shape into the shapes 24', 24" and 24'" under the deformation. Under this deformation the points 26 and 27 of the lower limiting surface are transferred into the points 26', 27', 26", 27", 26'", 27'". Every point on the lower limit surface will be moved in the radial direction under the process of deformation. The distance in the radial direction that each point is moved is dependent on the distance from the point to the axis of symmetry of the rivet. Points at a greater distance from the axis of symmetry axis will be transported a longer distance. Since the lower limit surface of the rivet is chamfered, the maximum displacement of a point in contact with the frame that is to be connected will be restricted. Less tension will thus occur on the frame. This results in that the surface layer coating the frame is subjected to lower tension and hence the surface coating will less likely to be destroyed. A second advantage is that the sharp edge formed on the transition from the upper limit surface to the lower limit when cold forming a rivet will not be in contact with the surface coated material.

The rivet is manufactured by shaping the mould in correspondence to the outer surface. An alternative method of manufacturing is that the outer surface is formed by subjecting the contact surface of the rivet to a chamfering process after the forming process.

The rivet is preferably made of steel.

I claim:

1. A rivet for joining surface treated objects, comprising a head having a contact surface consisting of an inner partial surface in a first plane and an outer partial surface and a shaft having a surface and a central axis, said shaft extending from said inner partial surface of said contact surface substantially perpendicularly to said first plane of said inner partial surface, said outer partial surface adjoining said inner partial surface at an intersection spaced from said surface of said shaft, and said outer partial surface extending from said intersection in a direction away from said shaft and said inner partial surface, whereby said outer partial surface is displaced from said first plane and adapted to contact one of the surface treated objects after the rivet is deformed during the riveting process for joining the surface treated objects.

2. The rivet of claim 1, wherein said outer partial surface is radially displaced at a greater distance in a radial direction from said central axis than said inner partial surface.

3. The rivet of claim 2, wherein said inner partial surface is planar.

4. The rivet of claim 1, wherein said intersection between said outer partial surface comprises a continuous transition.

5. The rivet of claim 4, wherein said inner partial surface has a radial dimension D and said outer partial surface has a radial dimension d, and wherein said relation of D/d is larger than about ⅓ and less than about 10.

6. The rivet of claim 1, wherein said intersection between said inner partial surface and said outer partial surface is curved.

7. The rivet of claim 1, wherein said head includes an upper limit surface adjoining said outer partial surface and said outer partial surface has a conical shape, said conical shape being truncated by said inner partial surface and by said upper limit surface.

8. A method of joining surface treated objects, comprising:
   a) providing a rivet comprising a head having a contact surface consisting of an inner partial surface in a first plane and an outer partial surface and a shaft having a surface and a central axis, the shaft extending from the inner partial surface substantially perpendicularly to the first plane of the inner partial surface, the outer partial surface adjoining the inner partial surface at an intersection spaced from the surface of the shaft and extending from the intersection in a direction away from the shaft and the inner partial surface whereby the outer partial surface has a first position displaced from the first plane; and
   b) riveting the objects so that the outer partial surface is moved from the first position to a second position extending in the first plane and contacting the surface treated object.

9. The method of claim 8, wherein points on the inner partial surface move in a radial direction away from the surface of the shaft and points on the outer partial surface move in the radial direction and in an axial direction toward the first plane when the objects are riveted.

* * * * *

UNITED STATES PATENT AND TRADEMARK OFFICE
CERTIFICATE OF CORRECTION

PATENT NO. : 6,042,316
DATED : March 28, 2000
INVENTOR(S) : Sällqvist

It is certified that error appears in the above-identified patent and that said Letters Patent is hereby corrected as shown below:

Cover page, [73], "Switzerland" should read --Sweden--.
Column 4, line 63, "objects after" should read --objects in said first plane after--.

Signed and Sealed this

Twenty-ninth Day of May, 2001

Attest:

NICHOLAS P. GODICI

*Attesting Officer*    *Acting Director of the United States Patent and Trademark Office*